May 9, 1944.   C. I. HUMMER   2,348,476
LUBRICATED VALVE
Filed July 2, 1943
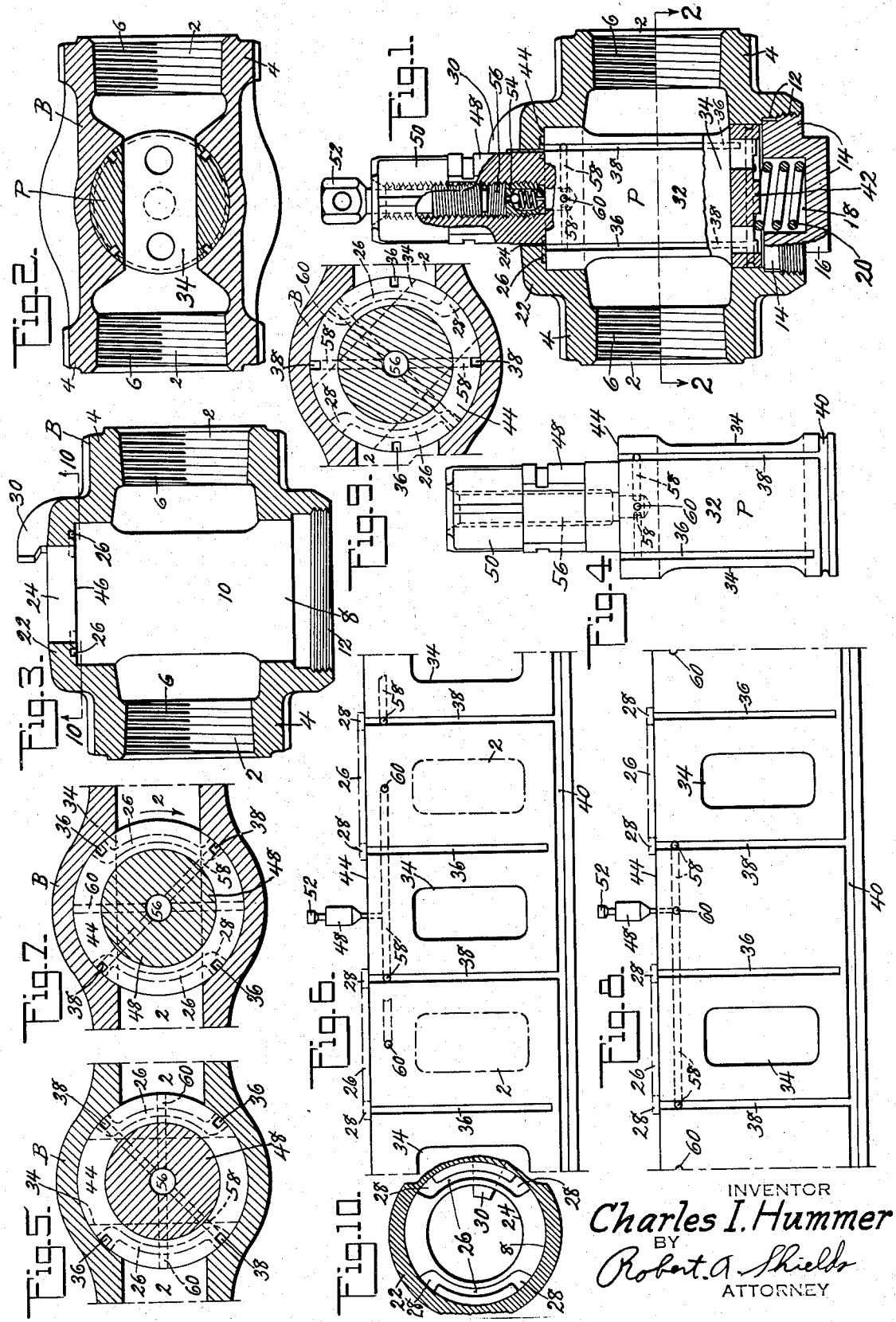
INVENTOR
Charles I. Hummer
BY
Robert A. Shields
ATTORNEY Patented May 9, 1944

2,348,476

UNITED STATES PATENT OFFICE 2,348,476

LUBRICATED VALVE

Charles I. Hummer, Detroit, Mich., assignor to American Car and Foundry Company, New York, N. Y., a corporation of New Jersey Application July 2, 1943, Serial No. 493,215

8 Claims. (Cl. 251—93)

This invention relates to valves in general and in particular to lubricated valves of the cylindrical plug type. One object of the invention is the provision of a lubricated plug type valve in which the lubricant groove, which is exposed to line fluid, is fully isolated from the lubrication system for the valve during turning of the plug.

A further object of the invention is the provision of a fully lubricated plug type valve which is effectively sealed by lubricant smeared on the seating surfaces by feeder holes and grooves.

A still further object of the invention is the provision of a fully lubricated plug valve in which the feeder groove, which is exposed to line fluid, is fed lubricant through arcuate grooves in the head of the valve body and only when the plug is substantially in the full open or closed position.

These and other objects of the invention will be apparent to persons skilled in the art from a study of the following description and accompanying drawing, in which Figure 1 is a partial sectional view taken substantially on the center line of the improved valve;

Fig. 2 is a sectional view taken substantially on line 2—2 of Fig. 1;

Fig. 3 is a sectional view showing the valve body;

Fig. 4 is an elevational view of the valve plug;

Fig. 5 is a partial sectional view similar to Fig. 2 and showing the relation of the various grooves in the plug and body;

Fig. 6 is a development of the seating surfaces of the plug and body when the valve is in the closed position as shown in Fig. 5;

Fig. 7 is a sectional view similar to Fig. 5 but showing the valve in open position;

Fig. 8 is a development of the seating surfaces of the plug and body with the valve shown in open position as in Fig. 7;

Fig. 9 is a sectional view similar to Figs. 5 and 7 but showing the valve in a partially open position in which the short groove is exposed to the line fluid, and Fig. 10 is a sectional view taken substantially on line 10—10 of Fig. 3 to better disclose the arcuate head grooves.

Referring now to the drawing in detail, it will be seen that the valve has been constructed of two main parts, namely, a body B and a plug P. The body portion of the valve is formed with a through passageway 2 defined at its outer ends by flanges 4 internally threaded at 6 to receive the connecting line pipe for passage of matter to and from the valve. A cylindrical bore 8 intersects the passageway 2 substantially at right angles and is carefully machined or surfaced to provide seating surface 10 for cooperation with the plug P previously referred to. The lower portion of the cylindrical bore is counterbored as at 12 and threaded to receive a base cap 14 having wrench receiving part 16 and a central opening 18 adapted to receive compression spring 20. The opposite end of the cylindrical bore is partially closed by head portion 22 having an opening 24 therethrough for reception of the plug stem later to be described. The inner surface of the head portion has formed therein, in any suitable manner such as casting, arcuate grooves 26 located in spaced relation to the edges of hole 24 and seating surface 10 of the cylindrical bore. The ends of the arcuate grooves terminate in enlarged end portions 28 directed outwardly to intersect the planes defining the cylindrical bearing surface 10 of the body, all as clearly shown particularly in Fig. 10. In order to limit rotation of the plug later to be described to a ninety degree motion and prevent unnecessary exposure of the plug grooves, a stop 30 is formed on the head portion and with its inner end overlapping the opening 24 of the head.

The plug P previously referred to is of cylindrical form having a seating surface 32 broken by a passageway 34 extending through the plug and of an area substantially equal to the area of the passageway 2 in the body. The seating surface of the plug is further interrupted by diametrically opposed short lubricant grooves 36 and longer diametrically opposed lubricant grooves 38. The seating surface is also interrupted below the lower side of passageway 34 by a continuous circumferential groove 40 disposed above the bottom end of the plug and intersecting the ends of relatively long grooves 38. As clearly shown, particularly in Fig. 1, the bottom of the plug is recessed slightly to provide a centrally located spring positioning plug 42 and a seat for the upper end of compression spring 20. The upper end of the plug is carefully machined to provide a seating surface 44 located in a plane intersecting at right angles the planes defining the seating surface 32. This end or shoulder seating surface 44 is interrupted at four points by the upper ends of grooves 36 and 38 as is clearly shown in Figs. 1, 4, 6 and 8. It is understood, of course, that the inner surface of the body head 22 is carefully machined to provide a cooperating seating surface 46 interrupted by the previously described arcuate grooves 26 and enlarged ends 28. In order to rotate the plug a stem 48 extends upwardly therefrom through opening 24 in the head and is formed with a wrench receiving portion 50 and is centrally drilled and tapped to receive a screw or ram 52 by means of which lubricant inserted in the hole of the stem may be forced into the lubrication system. As is customary, a check valve arrangement 54 is threaded into the lower end of the hole drilled in the stem and will prevent reverse flow of lubricant. In order to connect the lower end of the drilled hole 56 with the remainder of the lubricant system, radial holes 58 are drilled from grooves 38 inwardly to intersect the drilled hole, all as clearly shown in Figs. 1 and 4 to 9 inclusive. Lubricant can also be supplied from the lower end of hole 56 to the seating surfaces 32 and 10 by radial holes 60 intersecting the seating surface 32 adjacent the upper end of the plug and substantially intermediate grooves 36 and 38.

From the preceding it will be seen that lubricant inserted into the drilled hole in the stem may be forced by screw or ram 52 through the check valve and into radial holes 58 and 60. The lubricant entering holes 60 will be smeared over the upper end portions of seating surfaces 10 and 32 of the body and plug. The lubricant entering radial holes 58 can flow downwardly in longitudinal grooves 38 and fill the circumferential groove 40. The lubricant can also flow upwardly in grooves 38 and supply lubricant by smearing of the seating surfaces 44 and 46. Also when the valve is in substantially full open and full closed positions the lubricant flowing upwardly in grooves 38 will flow into the enlarged ends 28 and arcuate grooves 26 formed in the head portion of the valve and thence may flow downwardly to fill the short longitudinal grooves 36. The longitudinal grooves 38, circumferential groove 40 and radial holes 60 can at all times be supplied with lubricant irrespective of the position of the plug in the body and these grooves and holes will effectively smear the major portion of the seating surfaces of the plug and body. Upon a slight rotation of the plug the upper ends of longitudinal grooves 36 and 38 move away from the enlarged ends 28 of the arcuate grooves 26 formed in the head and the lubricant system is then immediately broken into three isolated parts, namely, the fully isolated longitudinal grooves 36 and the fully isolated arcuate grooves 26, and the remainder of the system which may be supplied with lubricant at all times. With this arrangement there can be no washout of lubricant by line fluid except in parts of grooves 36.

While the valve has been described more or less in detail with specific reference to the various figures, it will be obvious to persons skilled in the art that various modifications and rearrangements of parts may be made and all such modifications and rearrangements are contemplated as will fall within the scope of the appended claims defining my invention.

What is claimed is:

1. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of cavities formed in said body head portion and interrupting said body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, longitudinal grooves interrupting said plug seating surface adjacent the sides of said passageway and being extended upward to interrupt said plug head seating surface adjacent the periphery thereof and connect with said cavities when the valve is in substantially full open or closed position, a circumferential groove interrupting said plug seating surface adjacent the lower end thereof and connecting the ends of alternate longitudinal grooves, a source of lubricant pressure, and radial holes connecting said source of lubricant pressure to the alternate longitudinal grooves which are joined by the circumferential groove for supply thereto at all times of lubricant under pressure, said cavities and the remainder of the longitudinal grooves being cut off from connection with each other and with the alternate longitudinal grooves when the valve is in other than a substantially full open or closed position.

2. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, longitudinal grooves interrupting said plug seating surface adjacent the sides of said passageway and being extended upward to interrupt said plug head seating surface adjacent the periphery thereof and connect with the enlarged ends of said arcuate grooves when the valve is in substantially full open or closed position, a source of lubricant pressure, and radial holes connecting said source of lubricant pressure to alternate longitudinal grooves for the supply thereto at all times of lubricant under pressure, the remainder of said longitudinal grooves being cut off from connection with said source of pressure when the valve plug is in other than substantially full open or closed position.

3. A lubricated valve as claimed in claim 1 wherein additional radial holes interrupt the plug seating surface intermediate the ends of the plug passageway and are connected to said source of lubricant pressure at all times.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set and a second set of longitudinal grooves interrupting the plug seating surface adjacent the sides of the plug passageway, said sets of grooves being extended to interrupt the plug head seating surface adjacent the periphery thereof and to connect with the enlarged ends of said arcuate grooves when the valve is in substantially full open or closed position, a source of lubricant pressure, and means connecting said source of pressure to the first set of longitudinal grooves for the supply thereto at all times of lubricant under pressure.

5. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set and a second set of longitudinal grooves interrupting the plug seating surface adjacent the sides of the plug passageway, said sets of grooves being extended to interrupt the plug head seating surface adjacent the periphery thereof and to connect with the enlarged ends of said arcuate grooves when the valve is in substantially full open or closed position, a source of lubricant pressure, and means connecting said source of pressure to the first set of longitudinal grooves for the supply thereto at all times of lubricant under pressure, said second set of longitudinal grooves being connected with said source of pressure through said arcuate grooves only when the valve is in substantially full open or closed position.

6. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set and a second set of longitudinal grooves interrupting the plug seating surface adjacent the sides of the plug passageway, said sets of grooves being extended to interrupt the plug head seating surface adjacent the periphery thereof and to connect with the enlarged ends of said arcuate grooves when the valve is in substantially full open or closed position, a source of lubricant pressure, and means connecting said source of pressure to the first set of longitudinal grooves for the supply thereto at all times of lubricant under pressure, said arcuate grooves being each so arranged as to feed lubricant from a single groove of the first set of longitudinal grooves into one groove of the second set when the valve is substantially open and into another groove of the second set when the valve is substantially closed.

7. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set and a second set of longitudinal grooves interrupting the plug seating surface adjacent the sides of the plug passageway, said sets of grooves being extended to interrupt the plug head seating surface adjacent the periphery thereof and to connect with the enlarged ends of said arcuate grooves when the valve is in substantially full open or closed position, a source of lubricant pressure, and means connecting said source of pressure to the first set of longitudinal grooves for the supply thereto at all times of lubricant under pressure, said arcuate grooves and second set of longitudinal grooves being totally isolated each from the other when the valve is in any position other than substantially full open or closed position.

8. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a plurality of arcuate grooves formed in said body head portion and interrupting said body head seating surface, said arcuate grooves terminating in enlarged ends extending outwardly to the point of juncture of said head and body seating surfaces, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, a first set and a second set of longitudinal grooves interrupting the plug seating surface adjacent the sides of the plug passageway, said sets of grooves being extended to interrupt the plug head seating surface adjacent the periphery thereof and to connect with the enlarged ends of said arcuate grooves when the valve is in substantially full open or closed position, a source of lubricant pressure, means connecting said source of pressure to the first set of longitudinal grooves for the supply thereto at all times of lubricant under pressure, and a circumferential groove connecting the longitudinal grooves of said first set of longitudinal grooves together adjacent the ends thereof remote from the valve head.

CHAS. I. HUMMER.